United States Patent Office 3,597,295
Patented Aug. 3, 1971

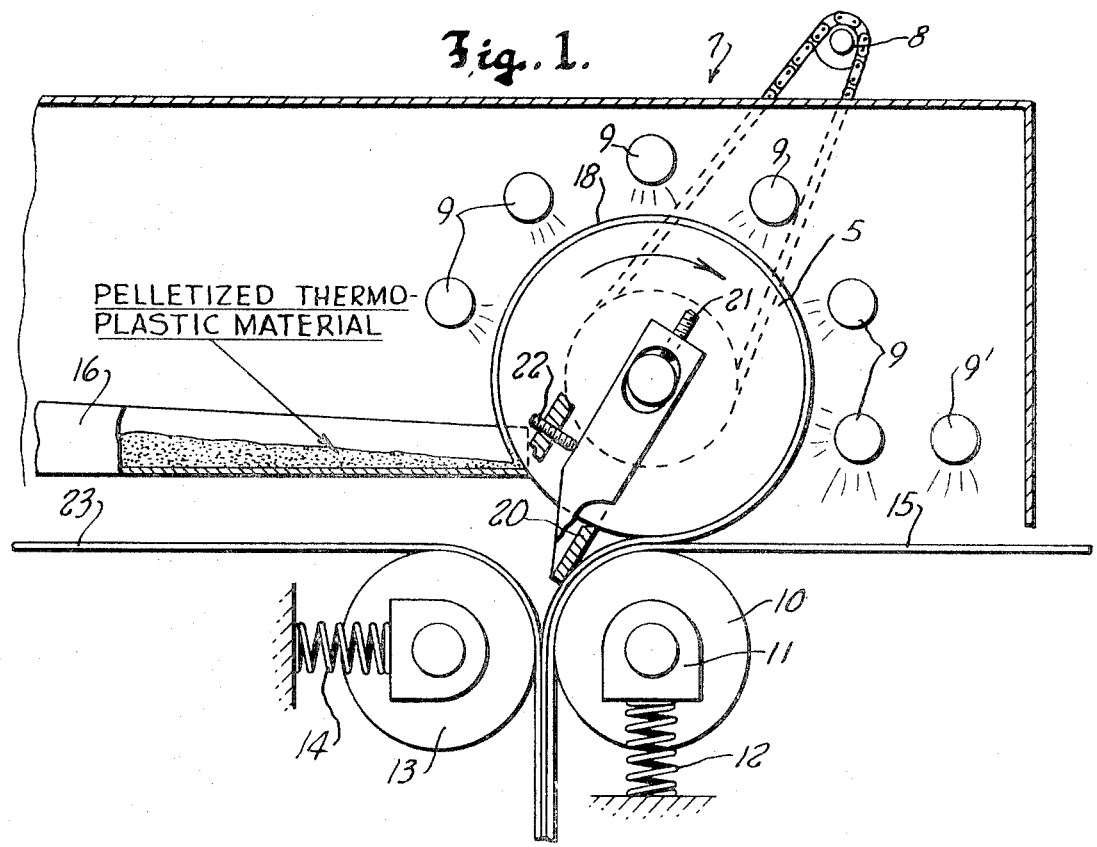
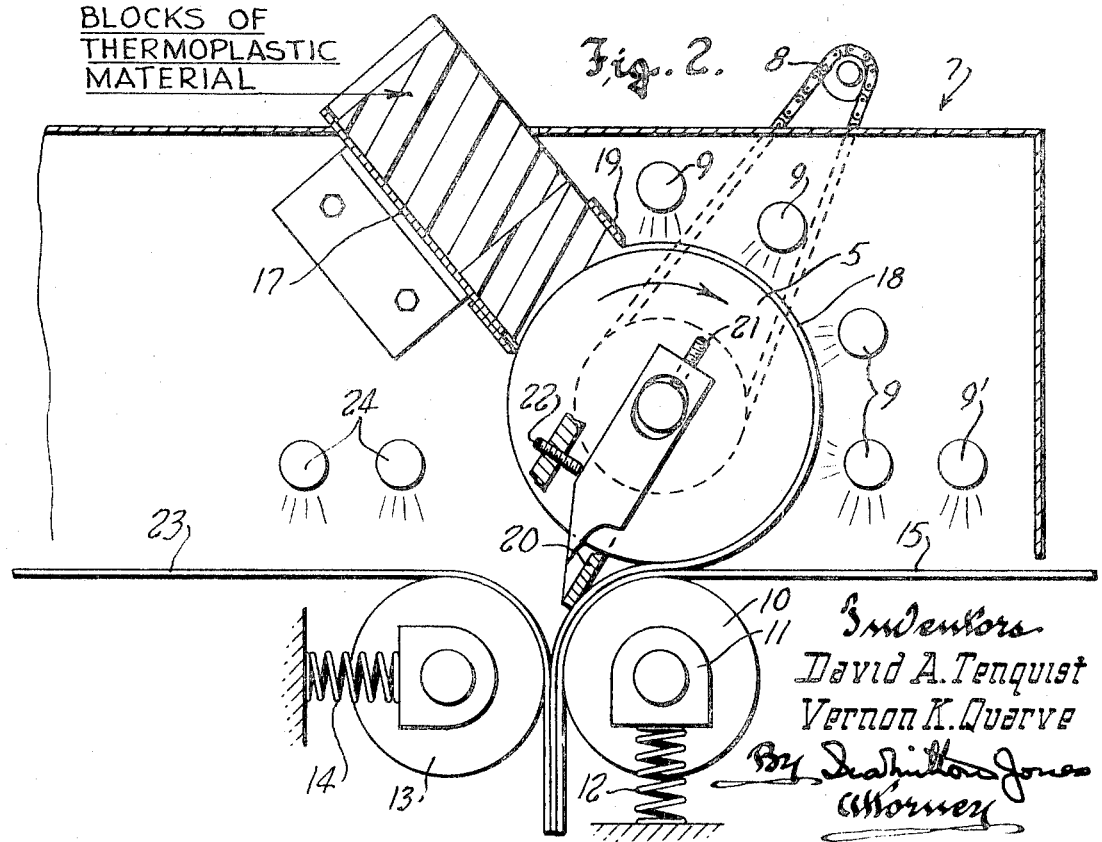

3,597,295
MACHINE FOR COATING TRAVELING SUBSTRATE WITH THERMOPLASTIC MATERIAL
David A. Tenquist and Vernon K. Quarve, Minneapolis, Minn., assignors to Possis Machine Corporation, Minneapolis, Minn.
Filed Feb. 3, 1969, Ser. No. 795,885
Int. Cl. B29b 3/02
U.S. Cl. 156—501                                        2 Claims

ABSTRACT OF THE DISCLOSURE

A heated drum constrained to rotate about a horizontal axis has thermoplastic material in the solid state fed to an upwardly traveling portion of its surface, whereupon the thermoplastic material is converted into a hot melt which adheres to the drum surface. A roller below the drum supports a substrate web and presses the same against the coated underside of the drum just ahead of a scraper blade which removes the material from the drum. A second roller presses a backing sheet against the freshly coated substrate as the latter travels over its supporting roller.

---

This invention relates broadly to coating machines, and refers more particularly to a machine for coating the back of a traveling substrate, such as tufted carpeting, with thermoplastic material in the molten state.

BACKGROUND OF THE INVENTION

Heretofore the application of molten thermoplastic material to the back of carpeting and similar web material was done by transferring molten thermoplastic material from a tank holding a supply thereof onto an applicator roll in contact with the surface of the web material to be coated. This transfer involved at least one roll which dipped into the molten tank contents and transferred molten material from the tank either directly or indirectly through other rolls, onto the applicator roll. The web of substrate generally traveled along a path which passed over the tank so that the coating operation took place in a zone most difficult to observe. Moreover, the large body of hot molten material was a fire hazard and the fumes given off thereby were a source of discomfort and irritation to the attendant workers.

The purpose and object of this invention is to overcome the objections inherent in prior substrate coating machines and especially those machines used for coating the back of carpeting. The invention accomplishes its purpose by providing a machine which converts thermoplastic material from the solid state into an adherent ribbon of molten plastic material known in the industry as hot melt, and then directly applies that ribbon of hot melt to the surface of the substrate being coated, in a manner that allows the coating operation to be readily observed.

The invention also has as one of its objects to provide a coating machine which not only applies hot molten thermoplastic material onto a surface of a traveling web of substrate, but also adheres a backing sheet to the freshly coated surface of the substrate.

SUMMARY OF THE INVENTION

The machine of this invention comprises structure providing an endless movable surface constrained to travel in a defined orbit having upper and lower portions; feeding structure adapted to receive thermoplastic material in the solid state and positioned to feed the same onto said endless surface as said surface passes the feeding structure; means for heating said surface and thermoplastic material carried thereby to melt the material; and supporting means across which the substrate moves, said supporting means being opposite a portion of the orbit of the endless surface at which said surface carries molten thermoplastic material, and being positioned to confine the substrate moving across the supporting means between it and the endless surface whereby molten thermoplastic material is transferred from said surface to one side of the substrate.

With these observations and objects in mind, the manner in which the invention achieves its purpose will be appreciated from the following description and the accompanying drawing. This disclosure is intended merely to exemplify the invention. The invention is not limited to the particular structure disclosed, and changes can be made therein which lie within the scope of the appended claims without departing from the invention.

The drawing illustrates two complete examples of the physical embodiments of the invention constructed according to the best mode so far devised for the practical application of the principles thereof, and in which:

FIG. 1 is a more or less diagrammatic side view of a coating machine embodying this invention in the form thereof especially adapted to use with pelletized thermoplastic material; and FIG. 2 is a similar view but showing the machine adapted to the use of thermoplastic material in block or brick form.

Referring to the accompanying drawing, the numeral 5 designates a horizontally disposed drum or cylinder having trunnions projecting from its ends to be journaled in bearings (not shown) that are carried by the frame of the machine designated generally by the numeral 7. The drum is power driven in any suitable manner as by means of a chain and sprocket 8, and when in operation rotates clockwise as viewed in both figures of the drawing. The surface of the drum is heated by infra-red lamps or tubes 9, to a temperature sufficient to convert thermoplastic material in the solid state into a molten hot melt condition.

Beneath the drum 5 is a work support roller 10 journaled in bearings 11 that are biased upwardly as by springs 12, to urge the roller against the underside of the drum. Preferably the axes of the drum and the roller 10 are in vertical alignment.

A second roller 13, which may be a duplicate of the work supporting roller 10, is mounted adjacent to the latter to be yieldingly urged towards it by springs 14 or the like.

The sheet-like substrate 15 which is to be coated, and which may be tufted carpeting, travels as a web over the work supporting roller 10 between it and the drum 5, and then downwardly between the rollers 10 and 13. As the substrate passes under the drum, the upwardly facing side thereof has molten thermoplastic material, i.e. hot melt, applied thereto by the drum, which has a ribbon or layer of hot melt adhering thereto. This ribbon or layer is formed by feeding thermoplastic material in the solid state to the hot surface of the drum.

The thermoplastic material may be fed to the drum in the form of pellets or granules, or in the form of blocks or bricks. If in pelletized form, a vibratory feed tray 16 is employed, as in FIG. 1.

The tray 16 may be of any conventional design and construction, but in any event its vibration advances the material thereon towards the hot surface of the drum where it is converted into a plastic, more or less tacky condition, which causes it to adhere to the drum surface.

If the thermoplastic material is to be fed to the drum in block or brick form, a feed chute 17 is employed, as shown in FIG. 2. This chute—which may be of any conventional design and construction—is downwardly inclined to allow the solid blocks or bricks of thermoplastic material placed therein to feed by gravity towards and onto the surface of the drum, or if necessary, be forced thereagainst by suitable biasing means acting on the blocks.

In either case, the thermoplastic material in the solid state, pelletized or in block form, is fed to the drum along the entire length thereof, and at a zone where the surface of the drum is traveling upwardly.

Where the thermoplastic material is fed to the drum in the form of solid blocks, the thickness of the layer or ribbon 18 of molten thermoplastic material, i.e. hot melt, adhering to the surface of the drum beyond the feeding station, is maintained substantially uniform by a doctor blade 19, which may be adjustable if desired; but where the material is in pelletized form no such doctor blade is needed. By adjustment of the vibratory feeder the thickness of the layer 18 can be held to the depth of a single layer of pellets.

In both cases a second doctor blade or scraper 20 riding on the surface of the drum, downstream of the zone of minimum contiguity between the drum and the work supporting roller 10, scrapes off any surplus hot melt that that may remain on the surface of the drum after the application thereof to the substrate; and preferably the heel of the scraper blade 20 is so positioned that it presses the hot melt against the substrate as it travels over the roller 10. The doctor or scraper blade 20 is preferably adjustable radially both with respect to the drum 5 and the roller 10. These adjustment may be respectively accomplished with screws 21 and 22.

By virtue of the upward bias on the work supporting roller 10, the application of the hot melt to the substrate takes place under pressure, so that the thermoplastic material is forced into the pores and interstices of the substrate. This is especially desirable in the case of tufted carpeting; and to promote penetration of the thermoplastic material into the substrate, it may be advantageous to preheat the latter as by a heating lamp 9'.

The purpose of the second roller 13 is to apply a backing sheet to the freshly coated side of the substrate. To this end, a web 23 of the backing material drawn from a supply thereof (not shown) is passed over the roller 13 and between it and the coated substrate traveling downwardly over the roller 10, the biasing force on the roller 13 serving to press the backing material against the coated surface of the substrate. If desired the backing material may be preheated as by heat lamps 24.

It will of course be appreciated that the thickness of the substrate, the backing material, and the layer of hot melt on the drum, as shown on the drawing, are not necessarily in proportion with one another. Liberties were taken in this respect in the interest of clarity. It should also be noted that the surface of the drum between the scraper 20 and the feed station is substantially free of thermoplastic material. This is important since it precludes objectionable buildup on the drum surface, which could interfere with proper functioning of the machine.

The fact that the thermoplastic material is fed to the drum surface at a portion thereof which travels upwardly, is also important in that it affords adequate subjection of the thermoplastic material to the heat source without unduly increasing the size of the drum.

What is claimed as our invention is:
1. A machine for applying a thermoplastic coating to a web of flexible substrate, comprising:
 (A) a drum mounted to rotate about a fixed horizontal axis so that upon being driven in one direction the surface of the drum at one side of a vertical plane containing said axis travels upwardly, and at the opposite side thereof it travels downwardly;
 (B) drive means for rotating the drum in said direction;
 (C) means for heating the drum surface;
 (D) a work supporting roller freely rotatably mounted directly beneath the drum with its axis parallel to that of the drum;
 (E) biasing means urging the work supporting roller upwardly towards the underside of the drum,
  so that a web of substrate fed between the drum and said roller from the side of said vertical plane at which the surface of the drum travels downward will be gripped between the drum and roller and drawn thereby through the machine;
 (F) means for feeding thermoplastic material in the solid state onto an area of the upwardly traveling surface of the drum,
  whereby a layer of molten thermoplastic material forms on the drum and is pressed into the web as the web is drawn between the drum and the work supporting roller;
 (G) doctor means riding on the surface of the drum beyond its contact with the web and ahead of the area of the drum surface onto which the thermoplastic material is fed; and
 (H) blade means positioned to press the freshly coated web of substrate between it and the surface of the roller.
2. The machine of claim 1, further characterized by:
 a second roller positioned to coact with said work supporting roller and by such coaction press a web of backing material traveling over said second roller against the coated web of substrate.

References Cited

UNITED STATES PATENTS

| | | | |
|---|---|---|---|
| 2,320,513 | 6/1943 | Drummond | 156—501X |
| 3,032,815 | 5/1962 | Gerber | 156—500X |
| 3,481,818 | 12/1969 | Wellen | 156—500X |

BENJAMIN A. BORCHELT, Primary Examiner

J. J. DEVITT, Assistant Examiner

U.S. Cl. X.R.

156—374